United States Patent [19]

Wyler

[11] 4,192,178
[45] Mar. 11, 1980

[54] APPARATUS FOR DETERMINING STAGNATION PRESSURE, STATIC PRESSURE, PITCH ANGLE, AND YAW ANGLE OF ELASTIC FLUID

[75] Inventor: John S. Wyler, Andover, Mass.

[73] Assignee: Westinghouse Electric Corp., Pittsburgh, Pa.

[21] Appl. No.: 920,580

[22] Filed: Jun. 29, 1978

[51] Int. Cl.² .................................... G01M 15/00
[52] U.S. Cl. ........................................ 73/116; 73/212
[58] Field of Search ........................ 73/116, 212, 714

[56] References Cited

U.S. PATENT DOCUMENTS

| 2,650,497 | 9/1953 | Renwanz | 73/212 |
| 3,167,952 | 2/1965 | Kitagawa | 73/116 |
| 3,699,811 | 10/1972 | Maiden et al. | 73/212 X |

Primary Examiner—Jerry W. Myracle
Attorney, Agent, or Firm—J. W. Keen

[57] ABSTRACT

An apparatus for measuring stagnation pressure and yaw angle as well as providing static pressure and pitch angle indications at any point in subsonic and supersonic elastic fluid streams. Determination of both the static and stagnation pressures at any selected point permits Mach number determination anywhere along the radial length of axial flow turbine blades. Such localized Mach number determinations permit close monitoring of blade performance in axial flow turbines.

3 Claims, 7 Drawing Figures

APPARATUS FOR DETERMINING STAGNATION PRESSURE, STATIC PRESSURE, PITCH ANGLE, AND YAW ANGLE OF ELASTIC FLUID

BACKGROUND OF THE INVENTION

1. Field of the Invention

This invention relates to axial flow turbines and more particularly to a probe for determining Mach number at any point along the radial length of the blades used in an axial flow elastic fluid turbine.

2. Description of the Prior Art

In axial flow turbines the usual method for determining individual blade row efficiencies is to conduct pressure traverses at the inlet and exit of the blade row in question. Highly supersonic elastic fluid flow often occurs at the exit of certain blade rows situated near the low pressure end of the turbine. It has been common practice to use a truncated cone probe to conduct pressure traverses upstream and downstream from blade rows which are candidates for such supersonic flow. Results obtained from the truncated cone probe traverses for supersonic fluid flow required correction due to the effect of shock waves on the probe. The correction was based on theory, but effects such as probe blockage were seldom accounted for and thus caused the corrected results to be questionable.

U.S. Pat. No. 3,832,903 which was patented on Sept. 3, 1974, discloses a probe and method for measuring stagnation pressure for gas streams of supersonic velocity. The aforementioned prior art probe utilizes three pressure taps to indicate the relative position of the probe and detect deviations from the original orientation of the probe in the plane of deflection of the gas stream. A primary disadvantage of the prior art device is a lack of any means for determining the static pressure corresponding to the measured stagnation pressure. An additional disadvantage of the prior art includes the complexity which is introduced in its use of three pressure measuring devices and taps associated therewith for determining, through comparative pressure ratios, the proper orientation of the probe relative to the gas stream. The prior art probe is typically used in wind tunnels which have static pressure taps at their walls and thus permit Mach number determination for gas streams flowing within the wind tunnel. As such, the prior art probe is not suitable for determining static pressure at points along the radial length of axial flow turbine blades since the static pressure typically varies from the blade's platform to its tip.

SUMMARY OF THE INVENTION

In general, the invention comprises a measuring apparatus for determining the stagnation pressure, static pressure, yaw angle and pitch angle at any point in an elastic fluid stream. The measuring apparatus constitutes a probe which gradually deflects a portion of the elastic fluid stream and isentropically decelerates it by using a compression fan, a first pressure measurement device for determining the stagnation pressure existing in the decelerated or stagnated region of the elastic fluid, and a second pressure measurement device for measuring a single pressure upstream from the stagnation region which is indicative of the static pressure and pitch angle of the undeflected fluid stream. Determination of static pressure at any point in an elastic fluid stream such as a blade row of an axial flow turbine permits computation of localized Mach numbers along the blade and determination of blade row efficiencies for any operating condition.

BRIEF DESCRIPTION OF THE DRAWINGS

The objects and advantages of this invention will be more apparent from reading the following detailed description in connection with the accompanying drawings, in which.

DESCRIPTION OF THE PREFERRED EMBODIMENT

Figure 1A:
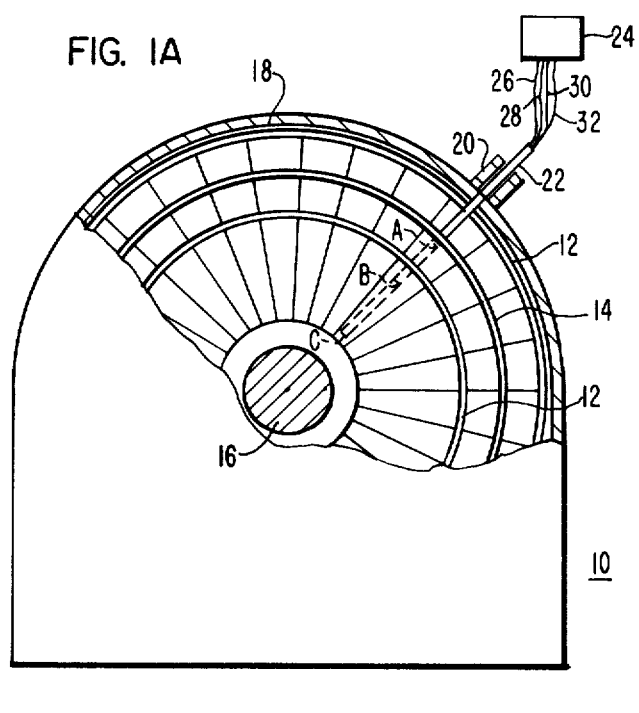
FIG. 1A and 1B are partial sectional and elevation views respectively of an axial flow turbine having probe guides for insertion therein of the present invention.
Figure 1B:
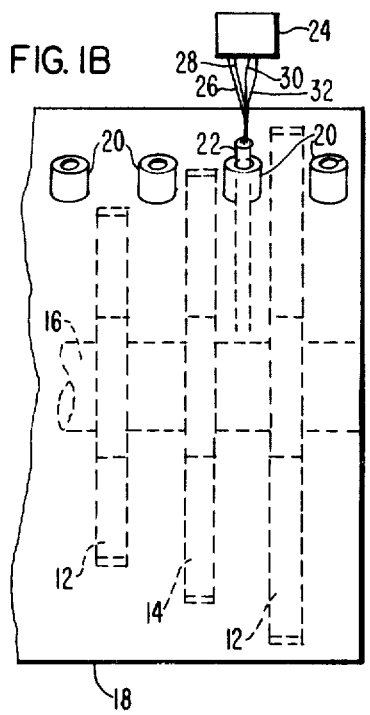

Referring now to the drawings in detail, FIGS. 1A and 1B illustrate an axial flow turbine 10 having alternating rows or rotatable blades 12 and stationary blades 14. While turbine 10 has been illustrated as a single element having two rotatable blade rows 12 mounted on rotor 16 and stationary blade row 14 disposed within turbine 10 and attached to casing 18, it is to be understood that multiple element turbines including either more or fewer turbine stages are amenable to pressure analysis with the present invention. Probe guides 20 extending through casing 18 are directed at oblique angles to the casing and blade rows to permit pressure measurements of the turbine's elastic, motive fluid at any point along the radial length of the blades both upstream and downstream from the blade row in question. FIG. 1A shows three such positions as A, B, and C. The oblique angles for probe guides 20 are chosen to minimize the change in pitch angle experienced by probe 22 in traversing each blade row from its tip to its base end. Probe 22 is illustrated in FIG. 1B in operating position downstream from rotatable blade row 12. Probe 22 fluidly communicates with pressure measuring means 24 through pressure transmitting conduits 26, 28, 30, and 32. Blade row 12's efficiency is determined by traversing the annular inlet and exit areas of blade row 12 with probe 22.

Figure 2A:
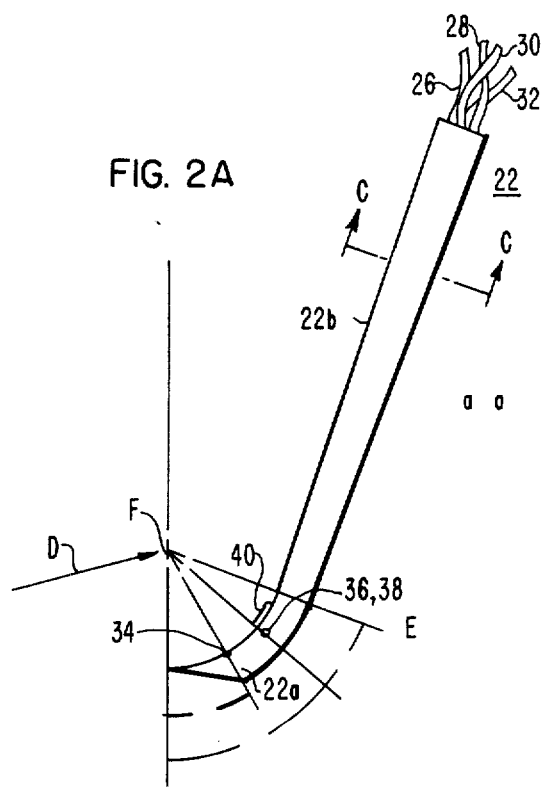
FIGS. 2A–2C are elevation and sectional views of the probe portion of the present invention.
Figure 2C:
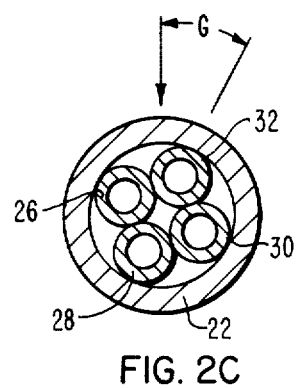
Figure 2B:
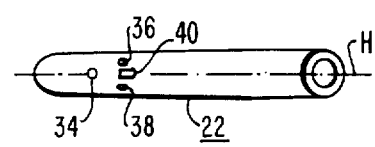

FIGS. 2A and 2B illustrate elevation and plan views respectively or probe 22. Pitch angle D represents the angle between the elastic fluid flow direction and the horizontal axis E of probe 22 as shown in FIG. 2A. Portion 22a of probe 22 is curved about point F and constitutes a sweep angle of 70 degrees. Portion 22b of probe 22 houses pressure lines 26, 28, 30 and 32 which are in respective fluid communication with taps 34, 36, 38, and 40. As shown in FIGS. 1A and 1B the pressure lines extend to pressure measuring means 24. Pressure tap 34 is, by example, 40 degrees below or downstream from horizontal center line E and provides an indication of the elastic fluid's static pressure shortly after its deceleration is initiated against probe section 22a. Pressure tap 34 is preferably forty degrees downstream from axis E since such position was found to provide optimum activity to changes in the impinging fluid's pitch angle and is useful for developing a pitch angle coefficient whose use will be later described. Pressure taps 36 and 38 can be balanced or equalized by altering the probe's position so as to reduce the probe's yaw angle, G, as defined in FIG. 2C to zero and assure proper probe orientation for accurate pressure measurement. The actual yaw angle of the elastic, motive fluid may be obtained by referencing the probe's balanced position to a calibrated indicator which may be on the turbine 10, probe guide 20, or other convenient location. Stagnation pressure of the elastic fluid is obtained by substantially isentropically decelerating that fluid along probe portion 22a to cause formation of a compression fan along that decelerating surface. Stagnation pressure tap 40 is disposed downstream from the probe's decelerating surface in a region of stagnated fluid. Pressure tap 40 provides a fluid communication port to the stagnated fluid region to permit measurement of total pressure for both subsonic and supersonic fluid flows since interfering shock waves which customarily accompany supersonic flow are substantially eliminated.

The decelerating fluid surface of probe 22 is preferably convex in shape and has pressure tap 34 and stagnation pressure tap 40 situated on the same longitudinal axis H. Probe 22 has 0.035 inch diameter pressure taps formed in its tubular body which is 0.25 inches in diameter by example. The radius of curvature of portion 22a is, by way of illustration, 0.75 inches and pressure taps 36, 38, and 40 are disposed 20 degrees downstream from horizontal axis E. The present invention's probe provides a sweep angle of 70 degrees which is typically required for axial flow turbines to permit insertion of the probe between axially adjacent blade rows.

Figure 3:
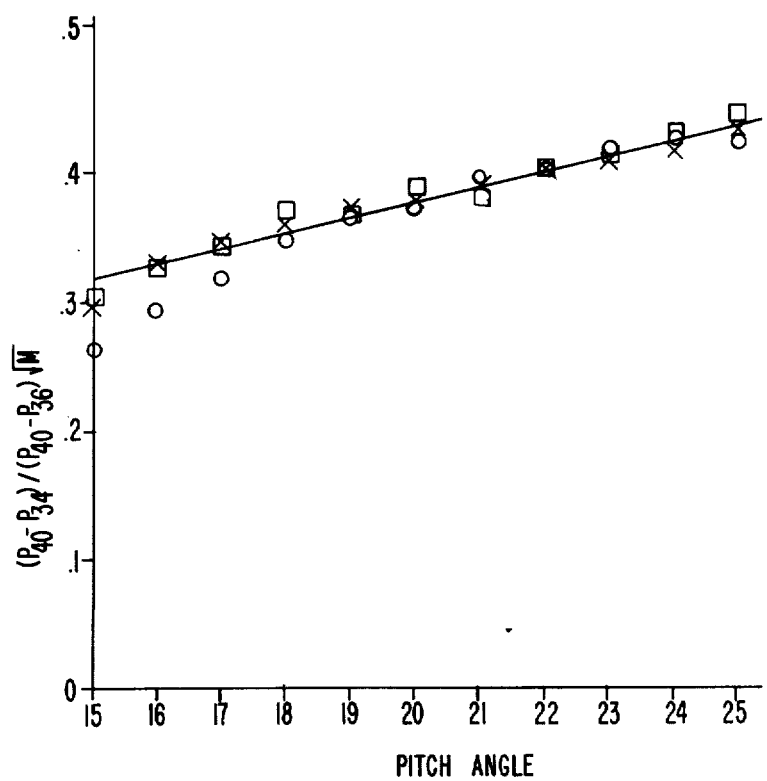
FIG. 3 is a plot of gas stream pitch angle versus pitch coefficient.
Figure 4:
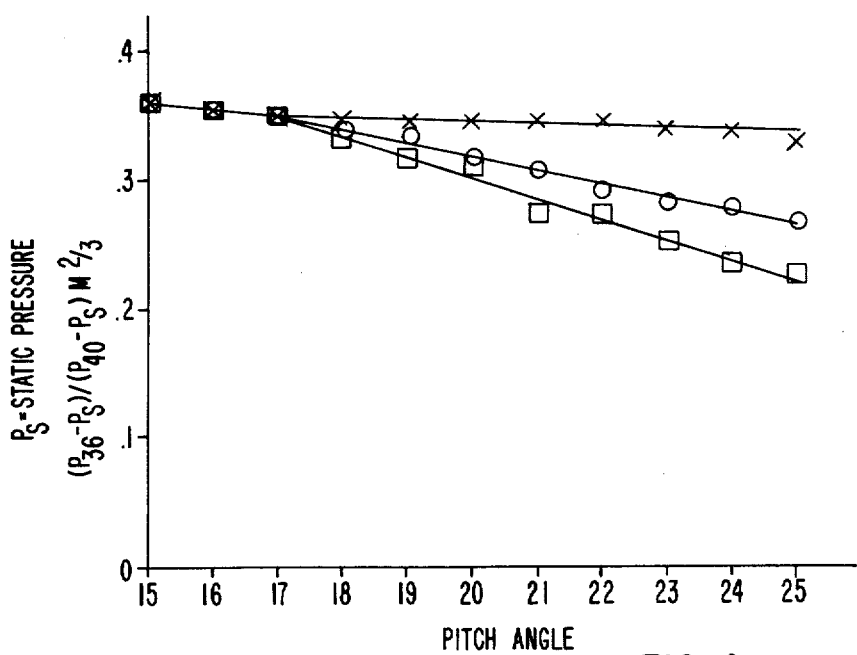
FIG. 4 is a plot of pitch angle versus static pressure coefficient.

FIGS. 3 and 4 are plots of pitch angle coefficient divided by the square root of Mach number and static pressure coefficient divided by Mach number to the two-thirds power respectively versus pitch angle D. The curve fits shown in FIGS. 3 and 4 were obtained from calibration of probe 22 in free air jets. The Mach number at any point along the blades of an axial flow turbine may be obtained by utilizing an iterative procedure between FIGS. 3 and 4. The iterative procedure necessitates initial Mach number estimation, subsequent Mach number calculation utilizing pressure measurements obtained from the probe, and acceptance of the estimated Mach number when the estimate and calculated values are in suitable agreement.

Utilization of the present invention provides direct stagnation pressure measurement at any point in a fluid stream such as along selected blade rows of an axial flow turbine, permits pitch angle, yaw angle, static pressure, and Mach number to be determined at those points and thus allows accurate determination of individual blade row efficiencies when those blade rows are traversed at their upstream and downstream sides. The simplified design of probe 22 provides high precision and superior reliability when compared with those of the prior art while, at the same time, supplying data for obtaining parameters (static pressure and pitch angle) at any point in the flowing gas stream.

I claim:

1. An apparatus for measuring the stagnation pressure and yaw angle and providing indications of static pressure and pitch angle at any point in an elastic fluid stream, said apparatus comprising:
    probe means for gradually deflecting, when inserted in an elastic fluid stream, a portion of the elastic fluid from its normal flow direction through an angular displacement causing compression and deceleration of the deflected fluid while restraining formation of interfering shock waves therein, said fluid deflection terminating in a region of fluid stagnation, said probe means being insertable into said fluid stream for selected distance so as to be exposable to any point within the fluid stream;
    first pressure measuring means in fluid communication with the fluid stagnation region for measuring the stagnation pressure of the elastic fluid stream;
    second pressure measuring means in fluid communication with the deflected fluid portion upstream from the stagnation region for measuring a single pressure which is indicative of the static pressure and pitch angle of the elastic, undeflected fluid stream; and
    third and fourth pressure measuring means in fluid communication with selected areas of said probe means for measuring the pressures in those areas and providing indications of said probe means' yaw position which is related to and provides a measurement of the undeflected fluid stream's yaw angle.

2. The pressure measurement apparatus of claim 1, said probe means comprising:
    a surface which smoothly curves from a direction substantially parallel to the undeflected fluid stream at its upstream end to a direction angularly displaced therefrom at its downstream end.

3. The pressure measurement apparatus of claim 2 wherein said surface is also smoothly curved in planes transverse to the flow lines of the deflected elastic fluid stream, said surface having a cross section transverse to the flow lines comprising a convex shape.

* * * * *